(12) United States Patent
Pei (10) Patent No.: US 12,031,666 B2
(45) Date of Patent: Jul. 9, 2024

(54) TELESCOPING, ROTATIONAL AND ADJUSTABLE TELEVISION FIXATION DEVICE

(71) Applicant: Xubo Pei, Shenzhen (CN)

(72) Inventor: Xubo Pei, Shenzhen (CN)

(73) Assignee: Xubo Pei, Shenzhen (CN)

( * ) Notice: Subject to any disclaimer, the term of this patent is extended or adjusted under 35 U.S.C. 154(b) by 0 days.

(21) Appl. No.: 16/317,515

(22) PCT Filed: May 25, 2018

(86) PCT No.: PCT/CN2018/088344
§ 371 (c)(1),
(2) Date: May 24, 2021

(87) PCT Pub. No.: WO2019/134330
PCT Pub. Date: Jul. 11, 2019

(65) Prior Publication Data
US 2024/0142045 A1 May 2, 2024

(30) Foreign Application Priority Data

Jan. 14, 2018 (CN) .......................... 201820009203.0

(51) Int. Cl.
*F16M 11/20* (2006.01)
*F16M 11/08* (2006.01)
*F16M 13/02* (2006.01)

(52) U.S. Cl.
CPC ......... *F16M 11/2092* (2013.01); *F16M 11/08* (2013.01); *F16M 13/02* (2013.01)

(58) Field of Classification Search
CPC ............... F16M 11/2092; F16M 11/04; F16M 11/2085; F16M 11/10; F16M 11/18; F16M 13/02; A47B 97/001; H04N 5/655
(Continued)

(56) References Cited

U.S. PATENT DOCUMENTS 7,345,870 B2 *  3/2008  Shin .................. F16M 13/02
                                                   248/920
8,693,172 B2 *  4/2014  Russell .............. F16M 11/2085
                                                   361/679.01
(Continued)

FOREIGN PATENT DOCUMENTS

CN        201555003 U      8/2010
CN        201561253 U      8/2010
(Continued)

OTHER PUBLICATIONS

International Search Report and Written Opinion for International Application No. PCT/CN2018/088344, mailed Oct. 8, 2018, 10 pages.

*Primary Examiner* — Todd M Epps
(74) *Attorney, Agent, or Firm* — Raj S. Dave; Dave Law Group LLC (57) ABSTRACT

The application provides a telescoping, rotational and adjustable television fixation device including a wall panel, a telescopic and rotating support arm, a front-rear tilting adjustment structure, and a television fixation structure. The television fixation structure includes an upper fixed arm and a lower fixed arm, which are respectively mounted to the front-rear tilting adjustment structure, and a fixed bar. In present disclosure, the wall panel, the rear arm, the front arm, the front-rear tilting adjustment structure, and the television fixation structure are engaged in together, to make the television to tilt up and down, turn left and right, and move back and forth, thus allowing for flexible adjustments based on the user's actual viewing requirements, and thereby improving the adaptability of the television. The television is mounted by the fixed bar, achieving a quick installation, a whole device with a simple structure, a high strength, and a good stability.

20 Claims, 5 Drawing Sheets

(58) Field of Classification Search
USPC .................................................. 248/277.1
See application file for complete search history.

(56) References Cited

U.S. PATENT DOCUMENTS

| | | | | |
|---|---|---|---|---|
| 10,563,811 B2* | 2/2020 | Pei | ..................... | F16M 11/2085 |
| 10,844,999 B2* | 11/2020 | Pei | ..................... | F16M 11/2085 |
| 10,944,937 B2* | 3/2021 | Pei | ......................... | F16M 11/10 |
| 10,969,056 B2* | 4/2021 | Pei | ....................... | F16M 11/04 |
| 11,215,315 B2* | 1/2022 | Pei | ..................... | F16M 11/2092 |
| 11,779,115 B2* | 10/2023 | Pei | ....................... | F16M 11/08 |
| | | | | 248/277.1 |
| 2009/0173860 A1 | 7/2009 | Remy | | |

FOREIGN PATENT DOCUMENTS

| | | |
|---|---|---|
| CN | 101886734 A | 11/2010 |
| CN | 101915351 A | 12/2010 |
| CN | 203453741 U | 2/2014 |

\* cited by examiner

TELESCOPING, ROTATIONAL AND ADJUSTABLE TELEVISION FIXATION DEVICE

CROSS-REFERENCE TO RELATED APPLICATION(S)

This application is a national phase filing under 35 U.S.C. 371 of Patent Application No. PCT/CN2018/088344, filed on May 25, 2018, and claims benefit of priority under 35 U.S.C. § 119 of China Patent Application No. 201820009203.0, filed on Jan. 4, 2018, the contents of each of which are hereby incorporated by reference in their entireties.

TECHNICAL FIELD

The present disclosure relates to the field of a mounting fitting of televisions, more particularly relates to a fixed device configured to mount a television to a wall, and also configured to mount a display.

BACKGROUND

With the elimination of traditional CRT televisions (TVs), flat-panel TVs have been fully promoted. A major advantage of the flat-panel TVs includes a small footprint and light weight, such that the flat-panel TVs can be mounted directly on a wall surface to reduce a space occupied by the flat-panel TVs. A traditional way configured to mount the flat-panel TV is to punch a hole in the wall surface, mount a TV bracket by screwing a screw in the hole, and then mount the TV to the TV bracket. A disadvantage of a conventional installation is that the conventional TV brackets are fixed structures, and a posture of the television is fixed when the television is mounted to the TV bracket, and an orientation and angle of the television cannot be adjusted according to actual viewing requirements. Thus, some people have invented adjustable TV brackets. However, most adjustable TV brackets have disadvantages, for example, complex structure, single adjustment mode, such as left-and-right turning movement, small adjustment range, and instability structure, limiting the popularization and application of the adjustable TV brackets.

SUMMARY

The technical problem of the present disclosure to be solved is to provide a television fixation device with reasonable structural design, convenient adjustment operation, and simultaneous adjustment of angle, distance and angle of the television.

In order to solve the above technical problem, an embodiment of the present disclosure provides a telescoping, rotational and adjustable television fixation device, the telescoping, rotational and adjustable television fixation device includes a wall panel, a telescopic and rotatable support arm, a front-rear tilting adjustment structure, and a television fixation structure. The wall panel includes an upper fixed pole, a lower fixed pole opposite to the upper fixed pole, and a connecting plate coupled between the upper fixed pole and the lower fixed pole. Elastic extension plates extend inwards from the connecting plate adjacent to the upper fixed pole and the lower fixed pole. The telescopic and rotatable support arm includes two rear arms and a front arm, one end of each rear arm is rotatably coupled to the corresponding elastic extension plate. The front arm is rotatably located between the two rear arms facing away from the connecting plate. The front-rear tilting adjustment structure is rotatably coupled to one end of the front arm facing away from the rear arm. The television fixation structure includes an upper fixed arm, a lower fixed arm, and a fixed bar, and the upper fixed arm and the lower fixed arm are respectively mounted to the front-rear tilting adjustment structure. The upper fixed arm in a longitudinal direction and the lower fixed arm in a longitudinal direction are parallel to the upper fixed pole in a longitudinal direction and the lower fixed pole in a longitudinal direction, respectively. The fixed bar defines a receiving hole for receiving the upper fixed arm and a bayonet for holding the lower fixed arm. A rotatable pipe clamp is arranged on the fixed bar. A fixed structure of the fixed bar is formed by the pipe clamp holding the lower fixed arm and fixedly coupled to the lower fixed arm.

In present disclosure, the wall panel, the rear arm, the front arm, the front-rear tilting adjustment structure, and the television fixation structure are engaged in together, to make the television (or display) to tilt up and down, turn left and right, and move back and forth, thus allowing for flexible adjustments based on the user's actual viewing requirements, and thereby improving the adaptability of the television (or display). The television is mounted by the fixed bar, achieving a quick installation, a whole device with a simple structure, a high strength, and a good stability.

BRIEF DESCRIPTION OF THE DRAWINGS

In order to describe the embodiments of the present disclosure or the technical solutions in prior art more clearly, accompanying drawings required for describing the embodiments or the prior art will be briefly introduces. Apparently, the accompanying drawings in the following description are merely the embodiments of the present disclosure, and other drawings may be obtained by those skilled in the art according to these accompanying drawings without paying any creative labor.

DETAILED DESCRIPTION

In the embodiment, as illustrated in FIG. 1 to FIG. 6, a telescoping, rotational and adjustable television fixation device 1000 includes a wall panel 1, a telescopic and rotatable support arm 100, a front-rear tilting adjustment structure 200, and a television fixation structure 300. The wall panel 1 is generally fixed to a wall surface. The television fixation structure 300 is mounted to the front-rear tilting adjustment structure 200, and the front-rear tilting adjustment structure 200 is mounted to the telescopic and rotatable support arm 100. A telescopic and rotatable adjustable structure of a television 27 is formed by a connection between the telescoping, rotational and adjustable television fixation device 1000 and the wall panel 1. The television fixation structure 300 includes an upper fixed arm 13, a lower fixed arm 15, and a fixed bar 16. The upper fixed arm 13 and the lower fixed arm 15 are respectively mounted to the front-rear tilting adjustment structure 200. The fixed bar 16 defines a receiving hole 23 for receiving the upper fixed arm 13 and a bayonet 24 for holding the lower fixed arm 15. A rotatable pipe clamp 18 is fixed to the fixed bar 16 by a rotating shaft 17. A fixed structure of the fixed bar 16 is formed by the pipe clamp 18 holding the lower fixed arm 15 and fixedly connecting to the fixed bar 16.

Figure 1:
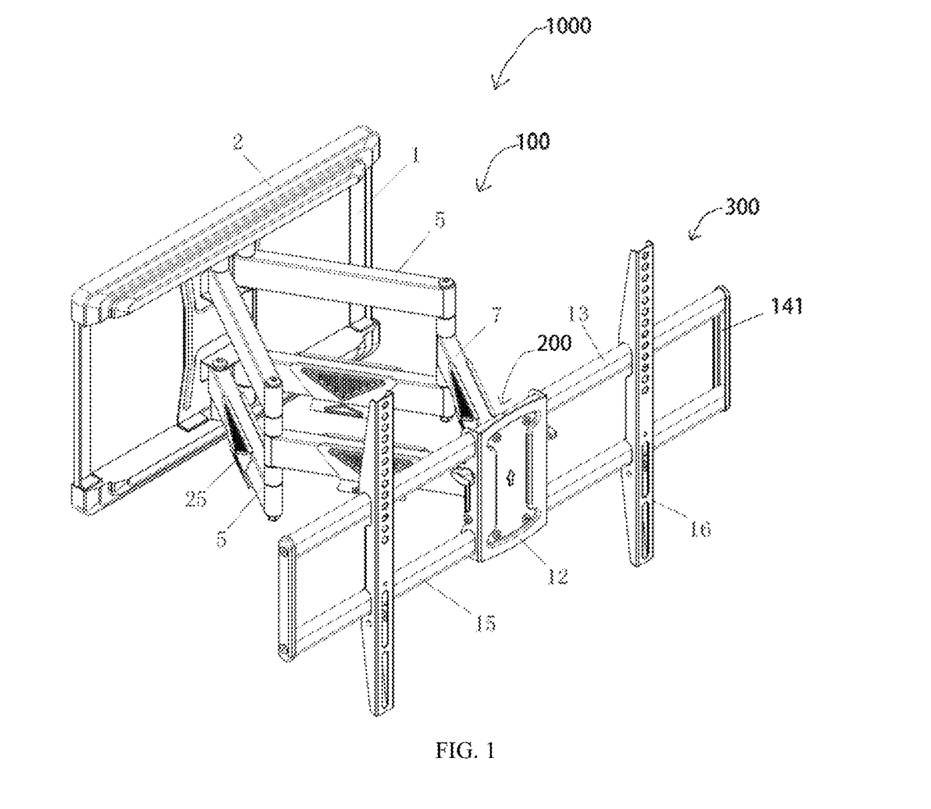
FIG. 1 is a structural schematic view of a television fixation device provided by an exemplary embodiment of the present disclosure.
Figure 2:
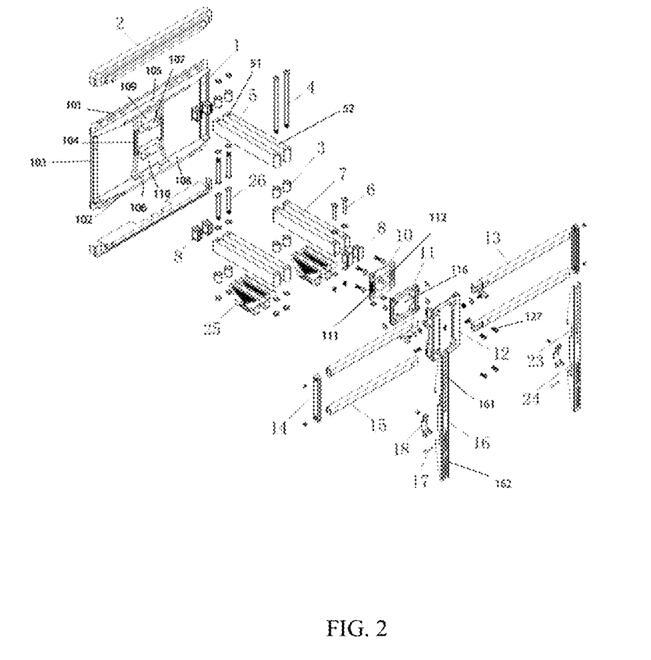
FIG. 2 is an exploded view of the television fixation device of FIG. 1.

In the embodiment, the wall panel 1 includes an upper fixed pole 101, a lower fixed pole 102 opposite to the upper fixed pole 101, two vertical poles 103 fixed respectively to two opposite ends of the upper fixed pole 101 and the lower fixed pole 102, and a connecting plate 104 fixed connected between a middle portion of the upper fixed pole 101 and the lower fixed pole 102. The upper fixed pole 101, the lower fixed pole 102, and the two vertical poles 103 form the rectangular wall panel 1. The connecting plate 104 is subjected to bearing stress of the upper fixed pole 101 and the lower fixed pole 102. The upper fixed pole 101, the lower fixed pole 102, and the connecting plate 104 are fixed on the wall surface, increasing a stability of the wall panel 1 and the wall surface.

In detail, an edge of the connecting plate 104 adjacent to the upper fixed pole 101 arranges two first bending pieces 105. The two first bending pieces 105 are welded to the upper fixed pole 101. An edge of the connecting plate 104 adjacent to the lower fixed pole 102 arranges two second bending pieces 106. The two second bending pieces 106 are welded to the lower fixed pole 102, thus enhancing a stability of the connecting plate 104 and the upper fixed pole 101 and the lower fixed pole 102. The connecting plate 104 arranges two bearing pieces 107, which are respectively opposite to the upper fixed pole 101 and the lower fixed pole 102. The two bearing pieces 107 in the extensional direction are respectively parallel to the upper fixed pole 101 in an extensional direction and the lower fixed pole 102 in an extensional direction The upper fixed pole 101 and the lower fixed pole 102 arrange respectively bearing platforms 108. The bearing platforms 108 in an extensional direction are parallel to the bearing pieces 107 in an extensional direction, to facilitate a bearing capacity of the telescopic and rotatable support arm 100 with the bearing pieces 107 and the bearing platforms 108. The connecting plate 104 is partially bent to form the bearing piece 107, and a through groove 109 is formed on the connecting plate 104. The through groove 109 is designed to reduce a weight of the connecting plate 104, facilitate a stability of the wall plate 1 fixed on the wall surface, thus the bearing pieces 107 can be elastically deformed relative to the connecting plate 104 under a large bearing capacity, providing a elastic buffer ability for the telescopic and rotatable support arm 100. After the television 27 is mounted on the television fixation structure 300, the television 27 applies a mounting force to the connecting plate 104 by the front-rear tilting adjustment structure 200 and the telescopic and rotatable support arm 100 under the gravity. The bearing piece 107 of the connecting plate 104 can absorb the mounting force of the television 27 under a condition allowing elastic deformation, thus preventing the mounting force of the television 27 from being transmitted to the wall panel 1 and the wall surface, preventing the wall panel 1 from being separated from the wall surface, enhancing a stability of the wall panel 1 and the wall surface, and thereby enhancing a stability of the television 27 mounted to the telescoping, rotational and adjustable television fixation device 1000.

More specifically, two elastic extension plates 110, which extends inward, are arranged on the connecting plate 104 adjacent to the upper fixed pole 101 and the lower fixed pole 102, respectively. The two elastic extension plates 110 are fixedly connected to the upper and lower portions of one end of the telescopic and rotatable support arm 100, respectively. Two bearing pieces 107 and two through grooves 109 are respectively arranged on the two elastic extension plates 110. The two elastic extension plates 110 in extending direction are substantially perpendicular to the upper fixed pole 101 and the lower fixed pole 102 in extending direction, and are substantially perpendicular to the bearing platform 108 in extending direction, that is, an extending direction of each of the elastic extension plates 110 is substantially perpendicular to an extending direction of the upper fixed pole 101 and an extending direction of the lower fixed pole 102, and is substantially perpendicular to an extending direction of the bearing platform 108. A deformation space is formed between the two elastic extension plates 110, thus the two elastic extension plates 110 can be elastically deformed relative to the upper fixed pole 101 and the lower fixed pole 102 under a certain bearing capacity to further absorb the mounting force of the television 27 mounting to the television fixation structure 300, and a stability of the wall panel 1 relative to the wall surface may be increased to make the telescoping, rotational and adjustable television fixation device 1000 to be difficultly detached from the wall surface.

In the embodiment, the telescoping, rotational and adjustable television fixation device 1000 further includes two telescopic and rotating support arms 100. Front arms 7 and rear arms 5 of the two telescopic and rotating support arms 100 can be unfolded or closed to each other to drive the front-rear tilting adjustment structure 300 and the television fixation structure 300 to telescope relative to the wall panel 1. Two telescopic and rotating support arms 100 are arranged side by side. Each telescopic and rotating support arm 100 includes a front arm 7 and two rear arms 5. One rotatable structure is formed by the two rear arms 5 connected to the wall panel 1 by a first threaded rod 26, and another rotatable structure is formed by the front arm 7 connected to the two rear arms 5 by a third threaded rod 4. A horizontal rotation angle is corporately formed between the front arm 7 and the rear arm 5, and the horizontal rotation angle is in a range of −45 degrees to +45 degrees. The telescopic and rotatable support arm 100 further includes a mounting pedestal 10. The mounting pedestal 10 is fixed at a front end of each of the left and right front arms 7 by a second threaded rod 6. The front-rear tilting adjustment structure 200 is connected to the mounting pedestal 10. A plurality of wire clamps 25 are arranged on the two front arms 7 and the lower two rear arms 5. The wire clamp 25 is simple to install and configured for receiving a wire, thus avoiding disorder. A butt joint part between the front arm 7 and the rear arm 5 is pulled outward to make the a front end of the front arm 7 move backward, thus realizing the forward and backward movement of the television 27, and thereby adjusting a viewing distance. The whole wall panel 1 is made by pulse welding, thus reducing manpower and material resources under a condition ensuring strength. Plastic covers 2 are respectively arranged on the upper fixed pole 101 and the lower fixed pole 102. The plastic cover 2 has a dustproof and waterproof function, thus enhancing a safety of the wall panel 1.

In the embodiment, an inside of the rear arm 5 and an inside of the front arm 7 are hollowed out to form slots, respectively, thus reducing a weight of the rear arm 5 and the front arm 7, and facilitating a rotation of the rear arm 5 and the front arm 7. The slots extend along a length direction of the rear arm 5 and the front arm 7, respectively. The telescopic and rotatable support arm 100 further includes two pipe plugs 8. The two pipe plugs 8 are inserted respectively into a rear end of the slot of the rear arm 5 and a front end of the slot of the front arm 7. The rear arm 5 is rotatably connected to the wall panel 1 by the first threaded rod 26 passing through the pipe plug 8, and the front arm 7 is rotatably connected to mounting pedestal 10 by the second threaded rod 6 passing through the pipe plug 8. A space ring 3 is arranged between a rear end of the front arm 7 and a front end of the rear arm 5. The rear arm 5 is connected to the front arm 7 by third threaded rod 4 passing through the space ring 3, thus achieving a more stable rotation process. Reinforcing iron pieces 9 are welded to the upper and lower surface of the inside of the front end of the front arm 7 and the inside of the rear end of the rear arm 5, respectively. After inserting the pipe plug 8 into the slots, the reinforcing iron pieces 9 are respectively padded on the upper and lower ends of the pipe plug 8 to form a reinforcing structure, thus ensuring a reinforcing structure, reducing weight of a product, and reducing costs.

In detail, the rear arm 5 includes a rear end 51 and a front end 52 opposite to the rear end 51. The pipe plug 8 may be partially inserted into the rear end 51 of the rear arm 5 to make the first threaded rod 26 pass through the rear end 51 and the pipe plug 8. It will be appreciated that, after the first threaded rod 26 sequentially passing through the upper fixed pole 101 (the lower fixed rod 102), the space ring 3, the rear end 51, the pipe plug 8 and the bearing pieces 107, a nut 261 is screwed to one end of the first threaded rod 26, to make the rear end 51 of the rear arm 5 to be rotatably connected between the bearing pieces 107 and the bearing platforms 108 of the upper fixed pole 101 (or the lower fixed pole 102), and the rear arm 5 is rotatable relative to the wall panel 1.

In detail, the third threaded rod 4 passes through the two rear arms 5, the two space rings 3, and a rear end of the front arm 7, and one end of the third threaded rod 4 is screwed to a front arm nut 41 to make the rear end of the front arm 7 to be rotatably connected between the two rear arms 5. A rear end of the front arm 7 is separated from the two rear arms 5 by two space rings 3, respectively. A rotatable direction of the front arm 7 relative to the rear arm 5 is parallel to a rotatable direction of the rear arm 5 relative to the wall panel 1, thus the television fixation structure 300 may be telescoped relative to the wall panel 1. Each of the front rear arm 7 is clamped by two rear arms 5, thus the rear arm 5 located at an upper portion may apply a pulling force to the front arm 7, and the rear arm 5 located at a lower portion may apply a supporting force to the front arm 7. Such that, the front arm 7 may be smoothly rotated relative to the rear arm 5, that is, the front end of the front arm 7 may always be telescoped relative to the wall panel 1 in horizontal direction.

In the embodiment, the mounting pedestal 10 arranges two connecting pieces 111. Two connecting pieces 111 are bent relative to the mounting pedestal 10. A through hole is formed on the mounting pedestal 10 between the two connecting pieces 111, thus generating the elastic deformation of the two connecting pieces 111 relative to the mounting pedestal 10.

In detail, the second threaded rod 6 passes through a front end of the front arm 7, the pipe plug 8, and the connecting piece 111, to make the front end of the front arm 7 to be rotatably connected to the mounting pedestal 10. The front end of the front arm 7 is clamped between the two connecting pieces 111, and the front end of the front arm 7 may be elastically deflected at a small angle relative to the mounting pedestal 10 with the two connecting pieces 111, thus absorbing mounting impact force of the television 27 by a connecting structure between the front arm 7 and the mounting pedestal 10.

Figure 4:
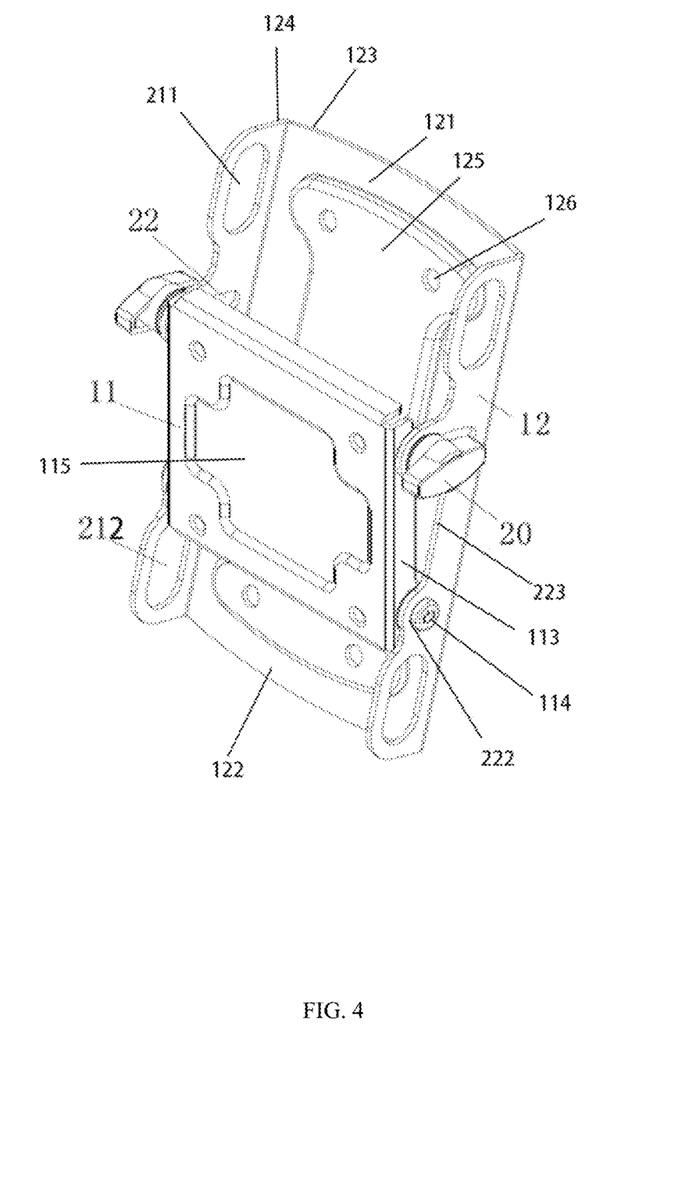
FIG. 4 is an assembled view of an adjusting pedestal and a fixed pedestal of the television fixation device of FIG. 1.
Figure 5:
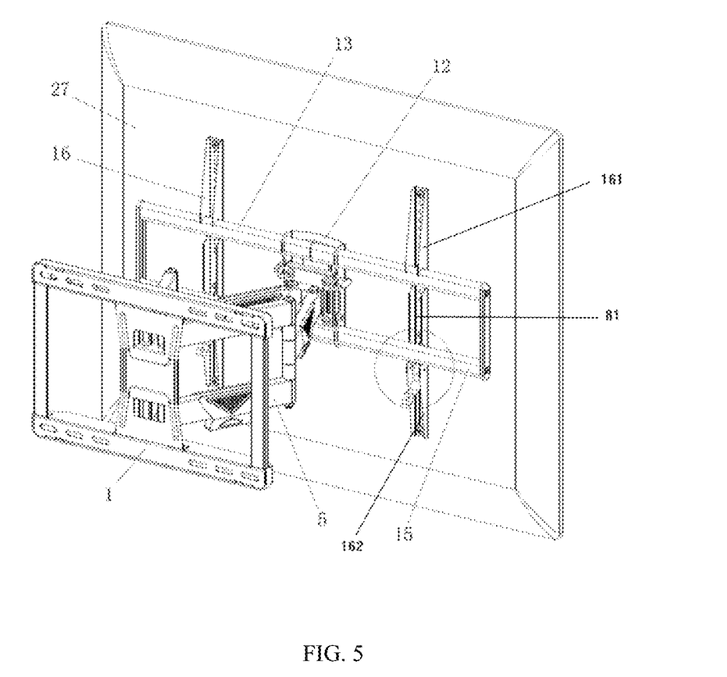
FIG. 5 is a use view of the television fixation device of FIG. 1.

In the embodiment, the front-rear tilting adjustment structure 200 further includes a fixed pedestal 11. The adjusting pedestal 12 is mounted to the fixed pedestal 11. The fixed pedestal 11 is fixed to the mounting pedestal 10. A middle portion of each side of the adjusting pedestal 12 defines an arc-shaped adjusting hole 22. A lower portion of the adjusting pedestal 12 is rotatably connected to one end of the fixed pedestal 11 by an adjusting screw 114. A threaded connection structure is formed by a middle portion of the adjusting pedestal 12 connected to the fixed pedestal 11 by an adjusting handle 20 passing through the adjusting hole 22. The both sides of the adjusting pedestal 12 can be locked or loosened by the adjusting handle 20, thus forming a front-rear tilting rotation structure by the adjusting pedestal 12 and the fixed pedestal 11. An angle of the adjusting pedestal 12 tilted back and forth relative to the fixed pedestal 11 is substantially in a range of −15 degrees to +5 degrees. A non-slip washer 201 is arranged between the adjusting handle 20 and the adjusting pedestal 12, thus increasing a damping force of the adjusting handle 20 and the adjusting pedestal 12. After loosening the adjusting handle 20, the adjusting pedestal 12 may be tilted up and down in the front-rear direction to tilt the television 27. After locking adjusting handle 20, the adjusting handle 20 can clamp the side plates correspondingly arranging the adjusting holes 22 of the adjusting pedestal 12 by the non-slip washer 201 and the side edges of the fixed pedestal 11, thus the side plates correspondingly arranging the adjusting holes 22 of the adjusting pedestal 12 may be fixed relative to the fixed pedestal 11 and the adjusting handle 20 under the damping force of the non-slip washer 201, and the television 27 may be fixed relative to the fixed pedestal 11.

In detail, the mounting pedestal 10 is substantially a rectangular shape. Four corners of the mounting pedestal 10 can be fixedly connected to the fixed pedestal 11 by screws. Two opposite edges of the fixed pedestal 11 arranges two bending side plates 113. One end of each of the bending plates 13 defines a screw hole. The adjusting handle 20 is screwed to the corresponding screw hole, thus the adjusting handle 20 may lock or loosen the fixed pedestal 11 and the adjusting pedestal 12. The other end of each of the bending plates 13 defines an axle hole. The axle hole is configured for the adjusting screw 114 passing through, thus the fixed pedestal 11 can rotate relative to the adjusting pedestal 12 by the adjusting screw 114. One side of the fixed pedestal 11 facing away from the adjusting pedestal 12 defines a recess 115, and the other side of the fixed pedestal 11 facing towards the adjusting pedestal 12 defines a protrusion 116, thus enhancing a stability of the fixed pedestal 11 by using the uneven design of the two sides of the fixed pedestal 11, and thereby increasing the pressure resistance of the fixed pedestal 11. The mounting pedestal 10 is closely abutted against the protrusion 116 of fixed pedestal 11, to make the fixed pedestal 11 substantially perpendicular to the front arm 7. If the front arm 7 is arranged in a horizontal direction, the fixed pedestal 11 may be arranged substantially in a vertical direction. An angle between a display screen of the television 27 and the vertical direction is adjusted by adjusting an angle between the adjusting pedestal 12 and the fixed pedestal 11.

More specifically, the front-rear tilting adjustment structure 200 further includes an adjusting pedestal 12. The adjusting pedestal 12 includes a first portion 121 and a second portion 122 opposite to the first portion 121. Both of the first portion 121 and the second portion 122 define a first butting hole 211 and a second hole 212. The upper fixed arm 13 and the lower fixed arm 15 have the same structure, and both have left and right portions. After a left portion of one upper fixed arm 13 and a right portion of another upper fixed arm 13 respectively passing through the two first butting holes 211 of the adjusting pedestal 12, the left portion of one upper fixed arm 13 is docked with the right portion of another upper fixed arm 13, and the left portion of one upper fixed arm 13 and the right portion of another upper fixed arm 13 are fixed to the adjusting pedestal 12 by screws. After a left portion of one lower fixed arm 15 and a right portion of another lower fixed arm 15 respectively passing through the two second butting holes 211 of the adjusting pedestal 12, the left portion of one lower fixed arm 15 is docked with the right portion of another lower fixed arm 15, and the left portion of one lower fixed arm 15 and the right portion of another lower fixed arm 15 are fixed to the adjusting pedestal 12 by screws.

In detail, the adjusting pedestal 12 further includes a main plate 123 and two side plates 124 bent towards the adjusting pedestal 12. The main plate 123 and the two side plates 124 are made in one piece. The two side plates 124 can be bent relative to the main plate 123 by a forging or stamping process. Two side plates 124 are formed on opposite edges of the main plate 123, respectively. The two side plates 124 in a longitudinal direction are substantially perpendicular to the main plate 123 in a longitudinal direction. The two side plates 124 in a longitudinal direction also substantially perpendicular to the upper fixed arms 13 and the lower fixed arms 15 in a longitudinal direction. That is, the main plate 123 in the longitudinal direction is substantially parallel to the upper fixed arms 13 and the lower fixed arms 15 in the longitudinal direction. When the upper fixed arms 13 and the lower fixed arms 15 are arranged in a horizontal direction, the two side plates 124 may be arranged in a vertical direction. Since the upper fixed arms 13 and the lower fixed arms 15 are arranged in the horizontal direction, a position of the television 27 may be easily adjusted by the fixed bar 16 in the horizontal direction of the upper fixed arms 13 and the lower fixed arms 15, thus realizing an adjustment of a horizontal position of the television 27. The first butting holes 211 and the second holes 212 are respectively defined at two ends of the side plate member 124 in the longitudinal direction, that is, The first butting holes 211 and the second holes 212 are respectively formed at the adjusting pedestal 12 in the longitudinal direction, thus, a structure for adjusting the fixed pedestal 11 to tilt and rotate may be arranged at a position of the side plates 124 between the first butting hole 211 and the second hole 212. When the fixed pedestal 11 and the adjusting pedestal 12 are rotated to a closed state, the fixed pedestal 11 is completely received in a receiving space corporately formed by the two side plates 124 and the main plate 123, thus the main plate 123 may be fitted to a main body of the fixed pedestal 11, the display screen of the convenient television 27 can be rotated to a position of a vertical plane with the adjustment pedestal 12, and it may be convenient to watch the display screen of the television 27 at a lower position. When the fixed pedestal 11 is unfolded relative to the adjusting pedestal 12, the adjusting pedestal 12 is inclined relative to the fixed pedestal 11, thus the display screen of the television 27 may be tilted downward relative to the fixed pedestal 11, and the television 27 is placed at a higher position, which is convenient for the user to watch.

More specifically, a position of each of the side plates 124 adjacent to the first butting hole 211 defines an arc-shaped adjusting hole 22. A position of each of the side plates 124 adjacent to the second butting hole 212 defines a opening 222 for passing through a screw. A notch 223 is formed between the adjusting hole 22 and the opening 222. A threaded post of the adjusting handle 20 passes through the adjusting hole 22 and is screwed to the screw hole of the fixed pedestal 11, thus the adjusting handle 20 may lock or loosen the fixed pedestal 11 and the adjustment pedestal 12. The adjusting screw 114 passes through the opening 222, and is rotatably connected to the shaft hole of the fixed pedestal 11, thus the fixed pedestal 11 can rotate relative to the adjusting pedestal 12. The adjusting hole 22 and the opening 222 are respectively adjacent to the first butting hole 211 and the second butting hole 223, thus the adjusting hole 22 and the opening 222 may be respectively arranged at the first portion 121 and the second portion 122 of the adjusting pedestal 12 to reinforce the structure of the first portion 121 and the second portion 122, and a stability of the adjusting pedestal 12 may be increased to prevent a structure of the adjusting pedestal 12 from being damaged. In an alternative embodiment, one side of the main plate 123 facing towards the fixed pedestal 11 arranges a boss 125, and the other side of the main plate 123 facing away from the fixed pedestal 11 forms a sunken space. The boss 125 is configured to enhance a structural strength of the main plate 123, thus the main plate 123 may be resistant to stress and difficult to deform. Opposite ends of the boss 125 is substantially wider than a middle of the boss 125, and a width of the boss 125 adjacent to the first butting hole 211 and the second butting hole 212 is substantially greater than a width of a middle portion of each of the side plates 124, thus the boss 125 may strengthen the structural strength of the first butting hole 211 and the second butting hole 212, and increase the stress capacity of the upper fixed arm 13 and the lower fixed arm 15. The boss 125 defines a plurality of screw holes 126 adjacent to the first butting hole 211 and the second butting hole 212. A screw 127 can pass through each of the screw holes 126, and the screws 127 are screwed to the upper fixed arm 13 and the lower fixed arm 15, thus enhancing the stability of the adjusting pedestal 12 and the upper fixed arm 13 and the lower fixed arm 15.

Figure 3:
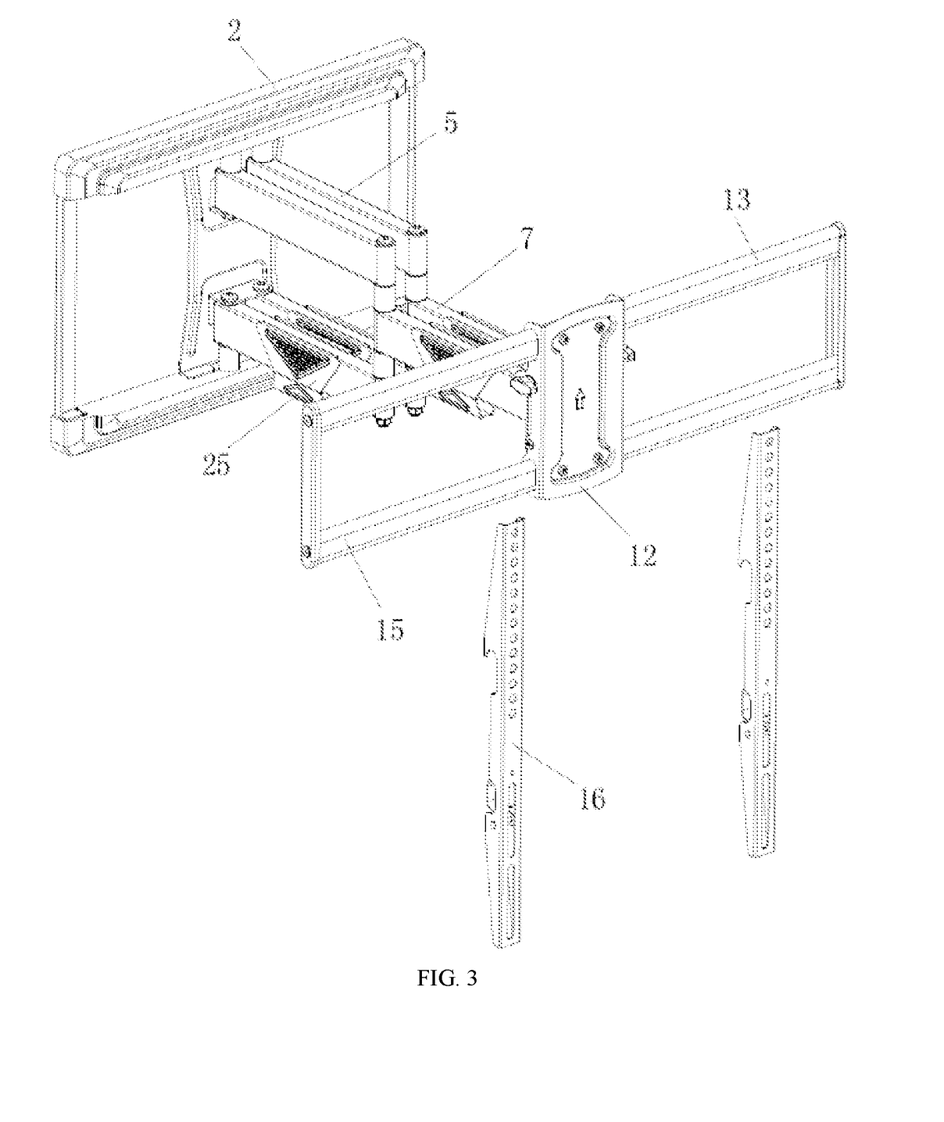
FIG. 3 is an assembled view of a fixed strip of the television fixation device of FIG. 1.

In the embodiment, a periphery of a cross-section of the upper fixed arm 13 is substantially elliptical, thus a appearance of the upper fixed arm 13 may have a rounded and smooth surface, which facilitates assembly of the upper fixed arm 13 with the adjusting pedestal 12, and facilitates the mounting of the fixed strip 16 and the upper fixed arm 13. The lower fixed arm 15 has substantially the same structure as the upper fixed arm 13, thus the lower fixed arm 15 and the upper fixed arm 13 can be manufactured using the same mold to reduce the manufacturing cost. Two opposite ends of the upper fixed arm 13 and the lower fixed arm 15 are respectively fixedly connected by two connecting rods 14, respectively. Each of the connecting rod 14 is fixedly connected to the upper fixing arm 13 and the lower fixing arm 15 by screws, respectively. The upper fixed arms 13 are configured as a mounting beam structure of the television 27, the lower fixed arms 15 are configured as an anti-sloshing structure of the television 27. The television 27 is mounted on the two upper fixed arms 13 through the two fixed bars 16, and is locked to the lower fixed arm 15 by the pipe clamp 18, to make the television 27 to be fixed to the upper fixed arm 13 and the lower fixed arm 15, thus achieving a simple, quick installation of the television 27.

In detail, one side of each of the connecting rods 14 defines a slot 141. One end of the upper fixed arm 13 and one end of the lower fixed arm 15 may be inserted into the slot 141. An inside wall of the slot 141 is clearance fitted to an outside wall of the upper fixed arm 13 and an outside wall of the lower fixed arm 15, thus increasing a structural stability of the connecting rods 14 and the upper fixed arm 13 and the lower fixed arm 15.

Figure 6:
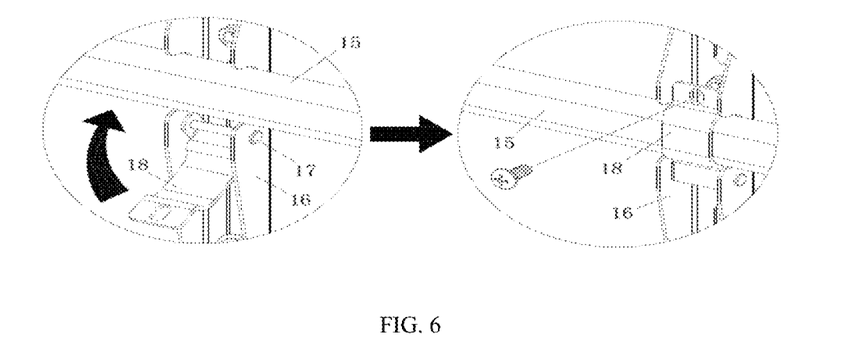
FIG. 6 is a structural schematic view of a pipe clamp of the television fixation device of FIG. 1.

In the embodiment, the two fixed bars 16 can be locked and fixed to a back of the television 27. The two fixed bars 16 include a porous locking end 161 and a multi-slot locking end 162. A plurality of locking holes, which are equally spaced, are arranged on the porous locking end 161, to make the fixed bar 16 to be engaged with a screw hole on the back of the television 27. The multi-slot locking end 162 defines a plurality of bar-shaped adapting slots, to make the adapting slots of the multi-slot locking end 162 to adapt to different specifications of televisions 27. One side of each of the fixed strips 16 facing away from the television 27 defines a receiving hole 23 and a bayonet 24. The receiving hole 23 is located at the porous locking end 161, and the bayonet 24 is arranged at the multi-slot locking end 162. One end of the pipe clamp 18 is rotatably connected to the fixed bar 16, and the other end of the pipe clamp 18 can be screwed to the fixed bar 16, thus the pipe clamp 18 and the fixed bar 16 may together hold the lower fixed arm 15. After the pipe clamp 18 and the fixing bar 15 are clamped the lower fixed arm 15, the pipe clamp 18 is received in an adjusting groove 81 of the fixing bar 16, to facilitate a protection of the pipe clamp 18.

In present disclosure, the wall panel, the rear arm, the front arm, the front-rear tilting adjustment structure, and the television fixation structure are engaged in together, to make the television (or display) to tilt up and down, turn left and right, and move back and forth, thus allowing for flexible adjustments based on the user's actual viewing requirements, and thereby improving the adaptability of the television (or display). The television is mounted by the fixed bar, achieving a quick installation, a whole device with a simple structure, a high strength, and a good stability.

The above embodiments do not limit the protection scope of the technical solutions. Any modification, equivalent replacement and improvement made in the spirit and principle of the above embodiments should be included in the protection scope of the technical solution.

What is claimed is:

1. A telescoping, rotational and adjustable television fixation device, comprising: a wall panel, a telescopic and rotatable support arm, a front-rear tilting adjustment structure, and a television fixation structure, wherein the is mounted on wall panel comprises an upper fixed pole, a lower fixed pole opposite to the upper fixed pole, and a connecting plate coupled between the upper fixed pole and the lower fixed pole; elastic extension plates extend inwards from the connecting plate adjacent to the upper fixed pole and the lower fixed pole, respectively; the telescopic and rotatable support arm comprises two rear arms and a front arm, one end of each rear arm is rotatably coupled to the corresponding elastic extension plate; the front arm is rotatably located between the two rear arms facing away from the connecting plate; is rotatably coupled to one end of the front arm facing away from the rear arm; the television fixation structure comprises an upper fixed arm, a lower fixed arm, and a fixed bar, and the upper fixed arm and the lower fixed arm are respectively mounted to the front-rear tilting adjustment structure; the upper fixed arm in a longitudinal direction and the lower fixed arm in a longitudinal direction are parallel to the upper fixed pole in a longitudinal direction and the lower fixed pole in a longitudinal direction, respectively; the fixed bar defines a receiving hole for receiving the upper fixed arm and a bayonet for holding the lower fixed arm; a rotatable pipe clamp is arranged on the fixed bar; and a fixed structure of the fixed bar is formed by the pipe clamp holding the lower fixed arm and fixedly coupled to the lower fixed arm.

2. The telescoping, rotational and adjustable television fixation device of the claim 1, wherein each of the elastic extension plates arranges two bearing pieces, which are bent and extend outward; and the two bearing pieces are respectively opposite to the upper fixed pole and the lower fixed pole; one end of one of the rear arms is rotatably located between the upper fixed pole and the bearing piece; and one end of the other one of the rear arms is rotatably located between the lower fixed pole and the bearing piece.

3. The telescoping, rotational and adjustable television fixation device of the claim 2, wherein a first bending piece is arranged on an edge of the connecting plate adjacent to the upper fixed pole; a second bending piece is arranged on an edge of the connecting plate adjacent to lower fixed pole; and the two bearing pieces in an extensional direction are parallel to the first bending piece in an extensional direction and the second bending piece in an extensional direction.

4. The telescoping, rotational and adjustable television fixation device of the claim 1, wherein the wall panel further comprises two vertical poles correspondingly fixed to both ends of the upper fixed pole and both ends of the lower fixed pole.

5. The telescoping, rotational and adjustable television fixation device of the claim 1, wherein the wall panel further comprises two plastic covers; and the two plastic covers are respectively fixed on the upper fixed pole and the lower fixed pole, and cover the upper fixed pole and the lower fixed pole.

6. The telescoping, rotational and adjustable television fixation device of the claim 1, wherein the telescoping, rotational and adjustable television fixation device comprises the two telescopic and rotatable support arms; and the front arms and the rear arms of the two telescopic and rotatable support arms are capable of unfolding or closing to each other to drive the front-rear tilting adjustment structure and the television fixation structure to telescope relative to the wall panel.

7. The telescoping, rotational and adjustable television fixation device of the claim 1, wherein the telescopic and rotating support arm further comprises a wire clamp detachably coupled to the front arm and the rear arm.

8. The telescoping, rotational and adjustable television fixation device of the claim 1, wherein an inside of the rear arm and an inside of the front arm are hollowed out to form slots, respectively.

9. The telescoping, rotational and adjustable television fixation device of the claim 8, wherein pipe plugs are inserted respectively into one end of the slot of the telescopic and rotatable support arm rotatably coupled to the rear arm and one end of the slot of the front arm rotatably coupled to the front-rear tilting adjustment structure.

10. The telescoping, rotational and adjustable television fixation device of the claim 8, wherein the telescopic and rotatable support arm further comprises a first threaded rod passed through one end of the rear arm and the pipe plug, and rotatably coupled to the elastic extension plate, and a second threaded rod passed through one end of the front arm and the pipe plug, and rotatably coupled to the front-rear tilting adjustment structure.

11. The telescoping, rotational and adjustable television fixation device of the claim 10, wherein the telescopic and rotatable support arm further comprises a mounting pedestal rotatably coupled to one end of the front arm facing away from the rear arm; and the front-rear tilting adjustment structure is fixedly coupled to the mounting pedestal.

12. The telescoping, rotational and adjustable television fixation device of the claim 11, wherein the mounting pedestal arranges two connecting plates, which are bent and extend outwards; one end of the front arm is rotatably located between two connecting plates; and the second threaded rod passes through the two connecting plates, one end of the front arm, and the pipe plug.

13. The telescoping, rotational and adjustable television fixation device of the claim 11, wherein a through hole is formed on the mounting pedestal between the two connecting plates.

14. The telescoping, rotational and adjustable television fixation device of the claim 11, wherein the front-rear tilting adjustment structure comprises a fixed pedestal and an adjusting pedestal; the fixed pedestal is fixedly coupled to the mounting pedestal, the adjusting pedestal is rotatably coupled to the fixed pedestal; and the television fixation structure is fixedly coupled to the adjusting pedestal.

15. The telescoping, rotational and adjustable television fixation device of the claim 14, wherein one side of the fixed pedestal facing away from the adjusting pedestal defines a groove, the other side of the fixed pedestal facing towards the adjusting pedestal forms a protrusion; and the protrusion closely abutted against the mounting pedestal.

16. The telescoping, rotational and adjustable television fixation device of the claim 14, wherein the adjusting pedestal comprises a first portion and a second portion opposite to the first portion; the upper fixed arm is fixedly coupled to the first portion, and the lower fixed arm is fixedly coupled to the second portion.

17. The telescoping, rotational and adjustable television fixation device of the claim 16, wherein the adjusting pedestal adjacent to the first portion defines an arc-shaped adjusting hole, and the adjusting pedestal adjacent to the second portion defines an opening for passing through a screw turned in the opening; the fixed pedestal is screwed by an adjusting handle passing through the adjusting hole; and the adjusting pedestal is rotatably coupled by an adjusting screw passing through the opening, to tilt or turn into a position of the adjusting pedestal relative to the fixed pedestal.

18. The telescoping, rotational and adjustable television fixation device of the claim 17, wherein a sliding washer is arranged between the adjusting handle and the adjusting pedestal.

19. The telescoping, rotational and adjustable television fixation device of the claim 17, wherein the adjusting pedestal comprises a main plate and two side plates bent relative to the main plate, and the adjusting hole and the opening are arranged on the two side plates.

20. The telescoping, rotational and adjustable television fixation device of the claim 19, wherein the upper fixed arm passes through the two side plates; a portion of the upper fixed arm located at the two side plates is fixedly coupled to the main plate; the lower fixed arm passes through the two side plates, and a portion of the lower fixed arm located at the two side plates is fixedly coupled to the main plate.

\* \* \* \* \*

UNITED STATES PATENT AND TRADEMARK OFFICE
CERTIFICATE OF CORRECTION

| | | |
|---|---|---|
| PATENT NO. | : 12,031,666 B2 | Page 1 of 1 |
| APPLICATION NO. | : 16/317515 | |
| DATED | : July 9, 2024 | |
| INVENTOR(S) | : Xubo Pei | |

It is certified that error appears in the above-identified patent and that said Letters Patent is hereby corrected as shown below:

On the Title Page

Item (30), Foreign Application Priority Data, "Jan. 14, 2018 (CN)" should read -- Jan. 4, 2018 (CN) --

Signed and Sealed this
Sixth Day of August, 2024

Katherine Kelly Vidal
*Director of the United States Patent and Trademark Office*